(12) United States Patent
Jang et al.

(10) Patent No.: US 7,906,879 B2
(45) Date of Patent: Mar. 15, 2011

(54) MOTOR

(75) Inventors: Jeong Cheol Jang, Gwangju (KR); Ji Min Lee, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 0 days.

(21) Appl. No.: 12/911,803

(22) Filed: Oct. 26, 2010

(65) Prior Publication Data

US 2011/0037331 A1 Feb. 17, 2011

Related U.S. Application Data

(63) Continuation of application No. PCT/KR2009/000675, filed on Feb. 12, 2009.

(30) Foreign Application Priority Data

Jan. 19, 2009 (KR) .......................... 10-2009-0004058

(51) Int. Cl.
*H02K 11/00* (2006.01)

(52) U.S. Cl. ............................. 310/71; 310/194; 310/43

(58) Field of Classification Search .................... 310/43, 310/71, 194, 254.1
See application file for complete search history.

(56) References Cited

U.S. PATENT DOCUMENTS

| 3,979,615 | A | * | 9/1976 | Neff ................................ 310/71 |
| 4,322,647 | A | * | 3/1982 | Neroda et al. ................... 310/71 |
| 4,476,407 | A | * | 10/1984 | Hildebrandt et al. ........... 310/71 |
| 4,649,304 | A | * | 3/1987 | Atherton et al. ................. 310/71 |
| 4,656,378 | A | * | 4/1987 | Atherton et al. ................. 310/71 |
| 5,465,016 | A | * | 11/1995 | Mancl et al. ..................... 310/71 |
| 7,834,496 | B2 | * | 11/2010 | Shin et al. ........................ 310/71 |
| 2004/0232785 | A1 | * | 11/2004 | Yamada et al. .................. 310/71 |
| 2006/0208585 | A1 | * | 9/2006 | Vollmuth et al. ................ 310/71 |

FOREIGN PATENT DOCUMENTS

| KR | 10-2008-0032959 | 4/2008 |
| KR | 10-2008-0049990 | 6/2008 |
| KR | 10-2008-0067415 | 7/2008 |

* cited by examiner

*Primary Examiner* — Thanh Lam
(74) *Attorney, Agent, or Firm* — Sherr & Vaughn, PLLC

(57) ABSTRACT

The present invention provides a motor comprising: a stator which contains a core insulated with an insulator and wrapped with a coil therearound, wherein the coil includes an aluminum core wire with a coating film therearound; a tab terminal including at least one slit in which the coil is inserted; and a magmate that is inserted into the tab terminal by forming both the slit to which the coil is electrically connected through insertion and a contact unit which contacts the external electric terminal for an electric connection, characterized in that the tab terminal is divided by a barrier into a coil connection space unit and a terminal connection space unit, and the slit opened from the upper side to the lower side is formed on an outer wall of the coil connection space unit to allow the insertion of the coil.

3 Claims, 5 Drawing Sheets

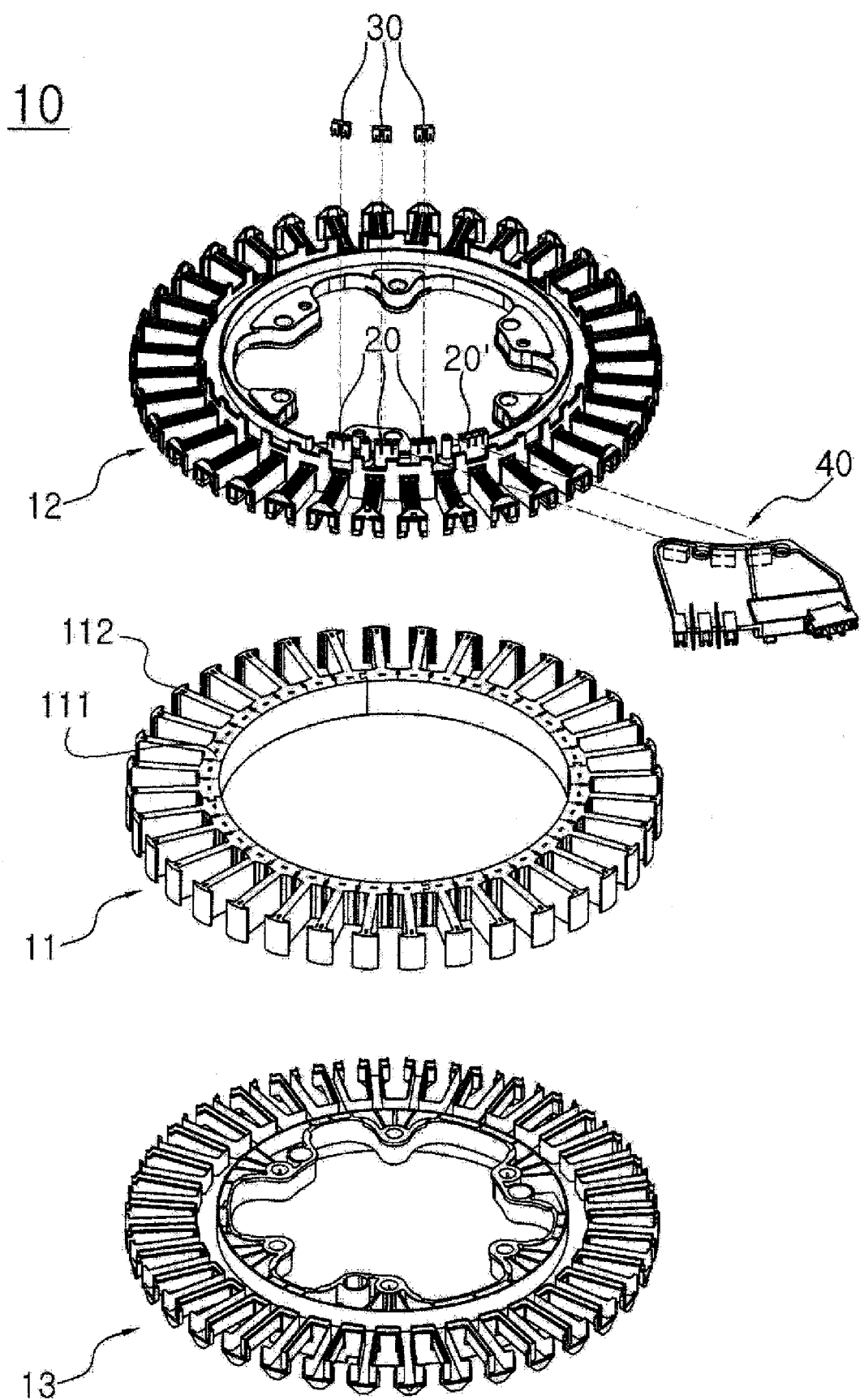

[Fig. 2]
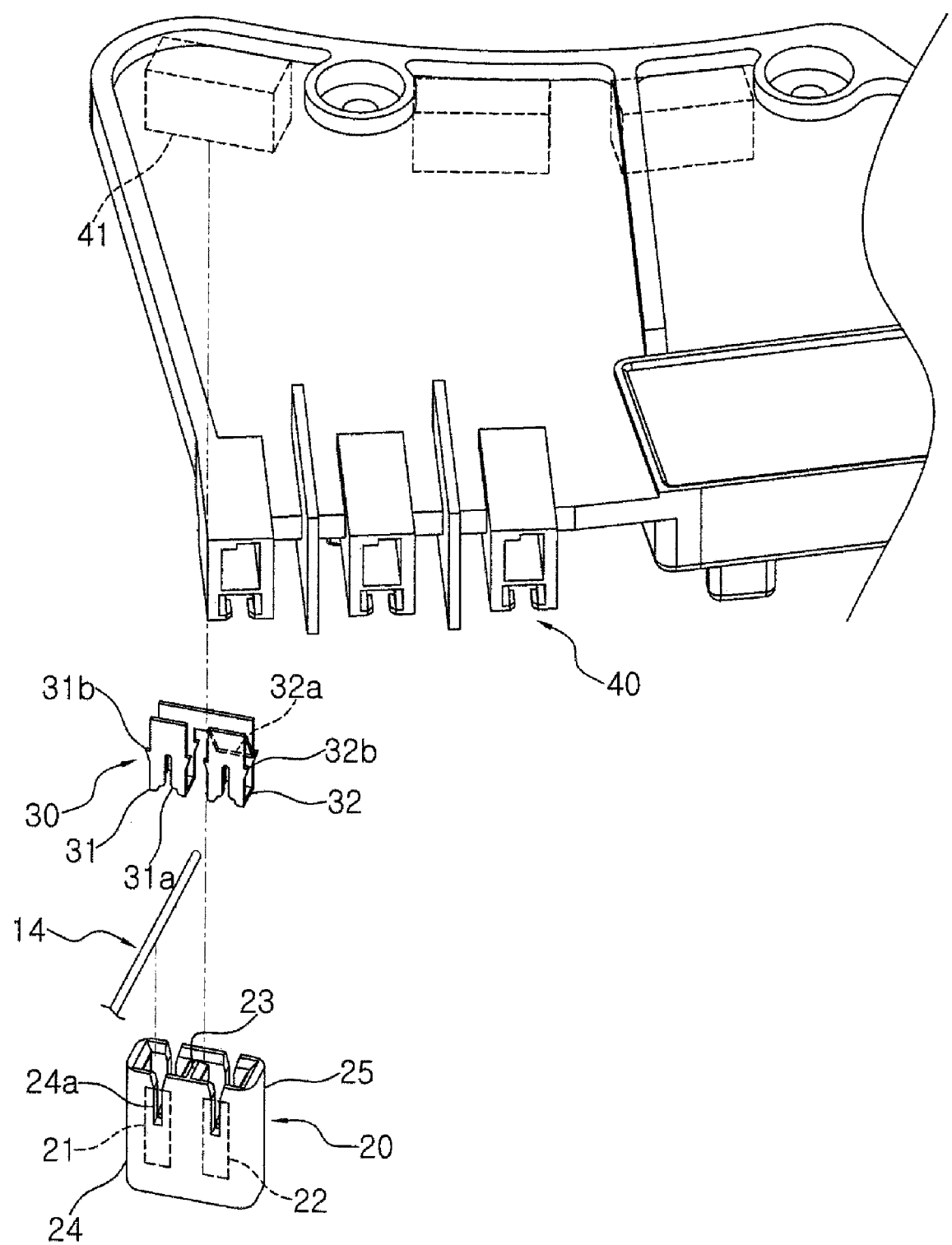

[Fig. 3]
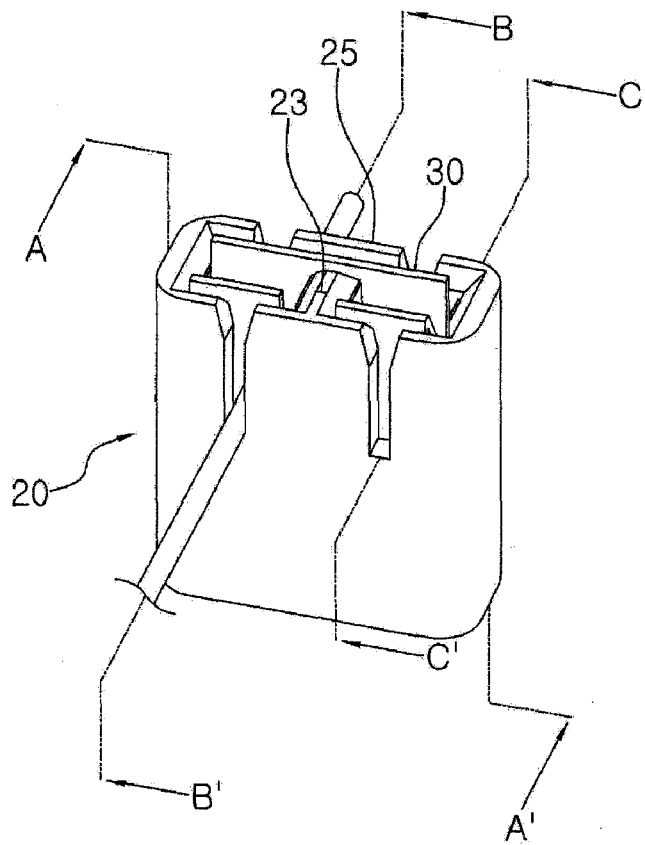
[Fig. 4]
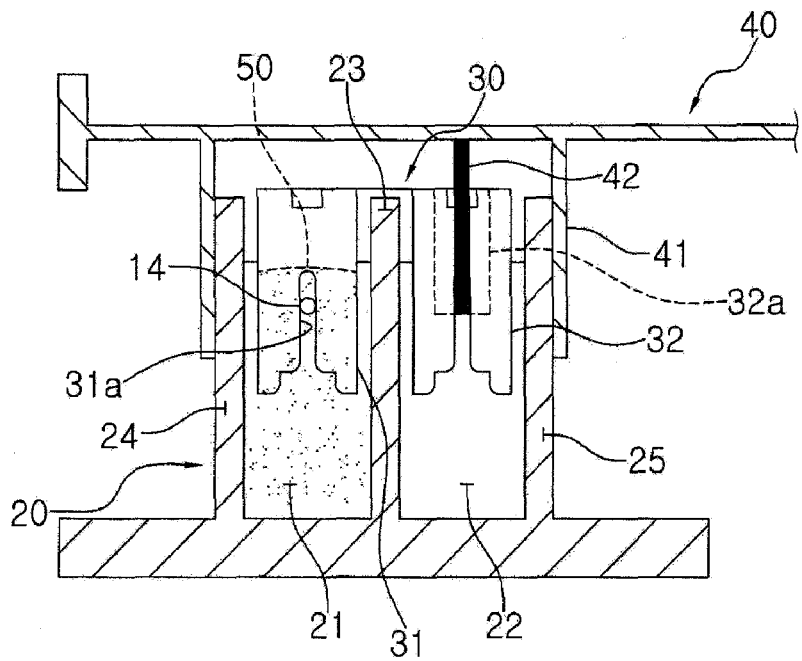

[Fig. 5]
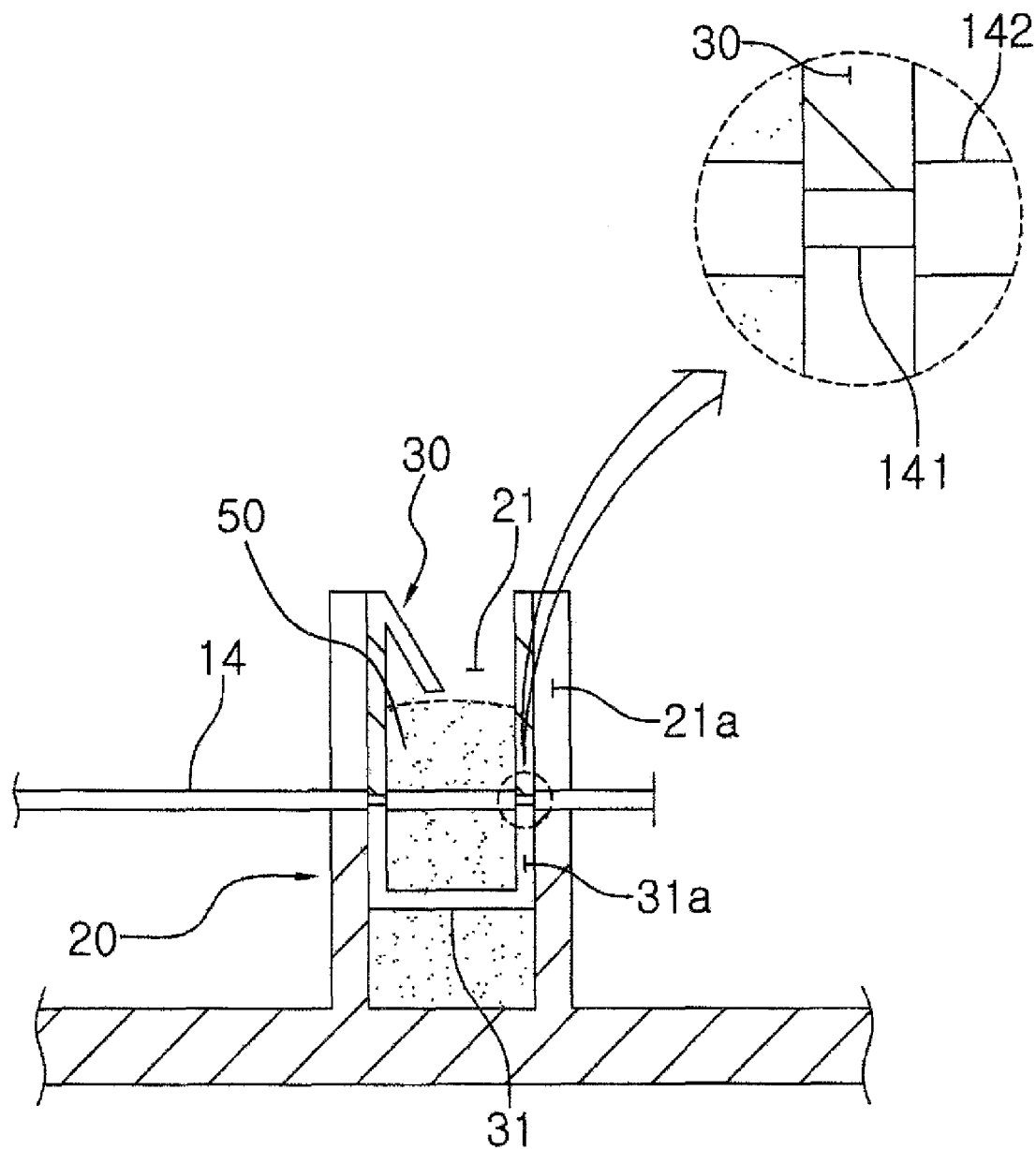

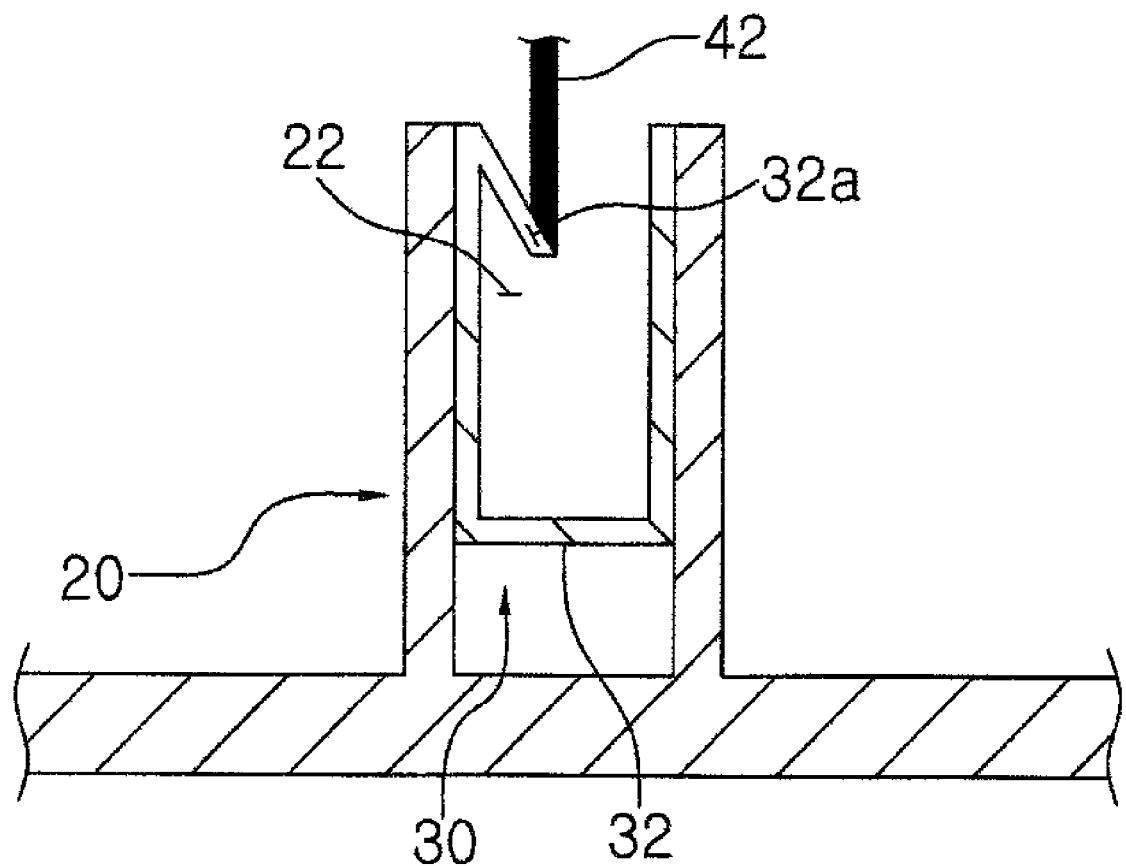
[Fig. 6]

MOTOR

CROSS REFERENCE TO PRIOR APPLICATIONS

This application is Continuation of PCT International Application No. PCT/KR2009/000675 (filed on Feb. 12, 2009) designating the United States, which claims priority to Korean Patent Application No. 10-2009-0004058 (filed on Jan. 19, 2009), which are all hereby incorporated by reference in their entirety.

TECHNICAL FIELD

The invention relates to a motor, in particular to the motor in which a tab terminal coupled to a magmate is divided into one portion connected to a coil and the other portion connected to an external electric terminal, wherein a resin fills in only the portion connected to the coil. Therefore, the motor can be easily manufactured by excluding the problem of a resin being applied to the portion connected to the external electric terminal.

BACKGROUND ART

In general, motor is a device that generates a rotation power by transforming electrical energy into mechanical energy, and the motor is classified as an AC motor or a DC motor according to the type of power applied and the AC motor is being used for the actuation of electric home appliances.

A motor comprises a stator and a rotor and rotates by a torque on the rotor generated from the rotating magnetic field generated during the AC flow on stator windings, and the rotation of the rotor is transferred to the rotating axis which causes the drive of a load. In particular, when applied to the washing machine, the rotating axis is connected to a drum of the washing machine and then the drum can be actuated.

Also, a printed circuit board is mounted on the motor and is connected the coil wound on the motor to supply power to the motor or to carry out the current flow of respective electrical elements on the printed circuit board to the motor. For this, a connector is connected as a medium between the coil and the printed circuit board, and is referred to as a magmate.

Copper is being used for the coil wound on the stator, but it costs a lot and increases the cost of manufacturing the motor. Thus, now, aluminum coil, instead of copper coil, is being used to decrease the manufacturing cost of the motor and provide raw material in a stable manner.

However, aluminum has a poor ductility relative to copper. Therefore, aluminum can be easily broken by an outer impact during the winding. Also, since aluminum is weak against water, in particular salt water, it can be easily corroded and broken down in case that it is in contact with salt water.

Korean laid-open patent publication No. 10-2008-0067416 discloses that when aluminum is used for the coil, electrically-insulating resin fills in the tap terminal into which the magmate connecting the coil is inserted, and then hardens, to reinforce the strength, prevent the corrosion, and insulate the end of the coil.

In general, the magmate has a contact portion which is electrically connected to an outer electrical terminal, and when resin fills in the tap terminal for the sealing of the portion to which the coil is connected, the exact quantity of resin must be filled in the tap terminal to prevent the contact of resin, which is very difficult as well as which causes a problem that the outer electrical terminal is not electrically connected to the contact portion when resin is in contact with the contact portion and then hardens.

DISCLOSURE OF INVENTION

Technical Problem

The present invention is devised under the recognition of the above problems and the purpose of the invention is to provide a motor in which a tab terminal coupled to a magmate is divided into one portion connected to a coil and the other portion connected to an external electric terminal, and a resin fills in only the portion connected to the coil, thereby the motor can be easily manufactured by preventing a resin from being applied to the portion connected to the external electric terminal.

Technical Solution

To achieve the purpose, the motor according to the present invention comprises: a stator which contains a core insulated with an insulator and wrapped with a coil therearound, wherein the coil includes an aluminum core wire with a coating film therearound; a tab terminal including at least one slit in which the coil is inserted; and a magmate that is inserted into the tab terminal by forming both the slit to which the coil is electrically connected through insertion and a contact unit which contacts the external electric terminal for an electric connection, characterized in that the tab terminal is divided by a barrier into a coil connection space unit and a terminal connection space unit, and the slit opened from the upper side to the lower side is formed on an outer wall of the coil connection space unit to allow the insertion of the coil; in that the magmate comprises: a coil connection terminal unit inserted into the coil connection space unit, a terminal connection terminal unit inserted into the terminal connection space unit, and a connection unit connecting the coil connection terminal unit to the upper portion of the terminal connection terminal unit; that the slit of the magmate is formed in the coil connection terminal unit to correspond to the slit of the coil connection space unit; that the contact unit of the magmate is formed in the terminal connection terminal unit; that the coil inserted into the slit of the tab terminal is electrically connected to the magmate through the insertion into the slit of the coil connection terminal unit while the coil connection terminal unit and terminal connection terminal unit of the magmate are respectively inserted into the coil connection space unit and terminal connection space unit of the tab terminal; and that the resin fills in and seals the coil connection space unit.

Also, the motor according to the invention is characterized in that the tab terminal is formed on the insulator to be integral with the insulator.

Further, the motor according to the invention is characterized in that it further comprises a connector having an outer electric terminal to be in contact with the terminal connection terminal unit such that the connector is connected to the tab terminal.

ADVANTAGEOUS EFFECTS

The motor according to the invention provides a motor in which a tab terminal coupled to a magmate is divided into one portion connected to a coil and the other portion connected to an external electric terminal, and a resin fills in only the portion connected to the coil to prevent a resin from being applied to the portion connected to the external electric terminal. Thus, advantageously, the motor can be easily manufactured.

BRIEF DESCRIPTION OF THE DRAWINGS

FIG. 1 represents an exploded perspective view of a stator of a motor according to an embodiment of the present invention.

FIG. 2 shows an exploded perspective view of a tap terminal of a motor and a magmate according to an embodiment of the present invention.

FIG. 3 shows a cross sectional perspective view representing that a magmate is connected to a tap terminal of the motor according to an embodiment of the present invention.

FIGS. 4 to 6 are cross sectional views taken from A-A', B-B', and C-C' of FIG. 3.

REFERENCE NUMBERS IN THE DRAWINGS INDICATE 10 stator
11 stator core
12, 13 insulator
14 coil
141 core
142 coating film
20 tab terminal
21 coil connection space unit
22 power connection space unit
23 barrier
24, 25 outer wall
24 a slit
30 magmate
31 coil connection terminal unit
31a slit
31b hook protrusion
32 power connection terminal unit
32a contact portion
32b hook protrusion
40 connector
41 insertion portion
42 outer electrical terminal
50 resin

BEST MODE FOR CARRYING OUT THE INVENTION

The motor of the present invention will be described in more detail referring to embodiments in accordance with accompanying drawings hereinafter.

FIG. 1 represents an exploded perspective view of a stator of a motor according to an embodiment of the present invention, FIG. 2 shows an exploded perspective view of a tap terminal of a motor and a magmate according to an embodiment of the present invention, and FIG. 3 shows a cross sectional view representing that a magmate is connected to a tap terminal of the motor according to an embodiment of the present invention.

The motor according to one embodiment of the present invention comprises a stator 10 and a rotor (not shown in the drawings) which rotates relative to the stator 10. Particularly, only the stator 10 is shown, and the motor shown in the drawings is intended for the motor of the washing machine. For the brevity, hereinafter, the description is based primarily on the washing machine motor as shown in the drawings.

As shown in FIG. 1, the stator 10 of the motor of the invention comprises a stator core 11, an upper insulator 12, a lower insulator 13, and coils 14 wrapped around the upper and lower insulators 12, 13.

The stator core 11 comprises circular back yokes 111 and teeth (112) protruded outwardly along the circumference of the back yoke 111. The stator core 11 is formed by punching and extracting a steel sheet and then stacking it.

The upper insulator 12 and the lower insulator 13 are made from insulating resin for surrounding the core 11 such that the core 11 can be insulated. A tap terminal 20 for the power terminal and a tap terminal 20' for the common terminal are protruded upwardly from the upper insulator 12. For example, three tap terminals 20 for the power terminal unit are shown in the drawings to correspond to a three-phase power supply. In one embodiment, the tap terminals 20, 20' are shown to be integral with the insulators 12, 13, however, they can be formed separately from the insulators 12, 13. The tap terminals 20, 20' have at least one slits 24 with which the coil 14 is engaged.

The coil 14 corresponds to the three-phase power supply and is wound on the insulators 12, 13. The coil 14 is configured such that a coating film 142 is coated on the outer portion of the core 141 made of aluminum. The starting and ending parts of the coil 14 are located respectively on a tap terminal 20 for power terminal and a tap terminal 20' for common terminal. A magmate 30 is inserted into the tap terminal 20 for power terminal and a connector 40 is connected to the tap terminal so that an outer electrical terminal 42 is electrically connected to the coil 14 through the magmate 30 and electricity is allowed to each coil 14. The end portions of each coil 14 are connected to each other at the tap terminal 20' for common terminal and form a common terminal.

The magmate 30 is configured to connect the coil 14 to the outer electrical terminal 42 at the connector 40. The magmate 30 comprises a slit 31a to be electrically connected by the insertion of the coil 14 and a contact unit 32a with which the outer electrical terminal 42 is contact to be electrically connected, and thus is inserted into the tap terminal 20 for the power terminal.

The connector 40 comprises the outer electrical terminal 42 to be electrically connected to the contact unit 32a of the magmate 30, and is connected to the tap terminal 20 for the power terminal to cover the tap terminal 20 for the power terminal. The connector 40 comprises an insertion portion 41 into which the tap terminal 20 is inserted, and the outer electrical terminal 42 is provided such that the end portion is protruded downwardly inside of the insertion portion (41).

Meanwhile, the end of the coil 14 is located at the tap terminals 20, 20' as described above. At the end of the coil 14, a coating film 142 is removed in such a manner a core 141 is exposed for the electrical connection. However, the exposed end of the coil has low strength and ductility and therefore would be broken down easily. Moreover, the contact with water, in particular salt water, would cause corrosion. Therefore, resin 50, which is insulating material, fills in and seals the tap terminals 20, 20' to make-up the strength, prevent the corrosion, and insulate the end of the coil. In particular, regarding the tap terminals 20, 20' to which the magmate 30 is divided into one portion to which the coil is connected, i.e. the coil connection space unit 21 and the other portion to which the outer electrical terminal is connected, i.e. the terminal connection space unit 22, so that resin 50 fills in only the portion to which the coil is connected, thereby resin would not be applied to the portion to which the outer electrical terminal 42 is connected.

Hereinafter, features of the structure having the tap terminals 20, 20' and the magmate 30 will be described in more detail. The tap terminals 20, 20' may be either a tap 20 terminal for the power terminal or a tap terminal 20' for common terminal. For the brevity of the description, only the tap terminal 20 for the power terminal is described hereinafter, and the same will be true for the tap terminal 20' for common terminal.

In accordance with the drawings, the tap terminal 20 is configured such that spaces 21, 22 into which the magmate 30 can be inserted are surrounded by outer walls 24, 25. The spaces 21, 22 are divided into a coil connection space unit 21 and a terminal connection space unit 22 by a barrier 23.

A slit 24a opened from the top to the bottom is formed at the front and rear of the outer wall 24 of the coil connection space 21 such that the coil 14 is inserted and is hooked. The end of the coil 14 is engaged with the slit 24a of both sides. Also, it would be preferable that the slit 24a has the width corresponding to the circumference of the coil 14. Preferably, the coil 14 is fixed at the same time through the interference fit of the coil by making the slit 24a of the coil connection space unit 21 slightly narrower than the outer diameter of the coil 14 including the coating film 142. Meanwhile, it would be preferable that the width should be not made to be too narrow during the above process so as to prevent the damage of the coating film 142.

The magmate 30 comprises: a coil connection terminal unit 31 inserted into the coil connection space unit 21, a terminal connection terminal unit 32 inserted into the terminal connection space unit 22, and a connection unit 33 connecting the upper portion of the coil connection terminal unit 31 to the upper portion of the terminal connection terminal unit 32. The coil connection terminal unit 31 and the terminal connection terminal unit 32 are respectively in the shape of 'ㄷ'. Hooking protrusions 31b, 32b that are inserted into the space units 21, 22 of the tap terminal 20 and then is pressed against and engaged with the inner portion of the outer walls 24, 25 are formed at each side of the coil connection terminal unit 31 and the terminal connection terminal unit 32, to prevent the magmate 30 from being removed from the tap terminal 20. The slit 31a of the magmate 30 is formed at the coil connection terminal unit 31 to correspond to the slit 24a of the coil connection space unit 21, and the contact portion 32a of the magmate 30 is formed at the terminal connection terminal unit 32. The slit 31a of the magmate 30 is opened from the bottom to the top at the front and rear sides and the width preferably corresponds to the thickness of the core 141 of the coil 14. Preferably, the coating film 142 of the coil 14 is removed while the core 141 of the coil 14 is being inserted into the slit 31a of the magmate 30 by a press-fitting, such that the coil is electrically connected to the magmate 30. In particular, the electrical connection of the magmate 30 and the end of the coil 14 may be preferably made such that after the end of the coil 14 is located at the slit 24a of the tap terminal 20, the coil connection terminal unit 31 of the magmate 30 is inserted into the coil connection space unit 21 of the tap terminal 20 and at the same time the core 141 is exposed. However, it is possible to expose the core 141 first, then followed by the insertion of the magmate 30 which will bring the electrical connection. FIGS. 4 and 5 show schematically how the magmate 30 and the end of the coil 14 are connected to each other. Referring to the drawings, as the coil connection terminal unit 31 and the terminal connection terminal unit 32 of the magmate 30 are respectively inserted into the coil connection space unit 21 and the terminal connection space unit 22 of the tap terminal 20, the coil 14 inserted into the slit 24a of the tap terminal 20 is inserted into the slit 31a of the coil connection terminal unit 31, thereby the coil 14 being electrically connected to the magmate 30. Particularly, the coil connection terminal unit 31 of the magmate 30 and the end of the coil 14 are electrically connected in the coil connection space unit 21 of the tap terminal 20, and the core 141 of the coil 14 is directly contact with the coil connection terminal unit 31 of the magmate 30 having conducting material, thereby the electrical connection being attained. Thus, the very part of the coil 14 that is in contact with the coil connection terminal unit 31 of the magmate 30 is configured such that a coating film 142 is removed. Therefore, the breakage of the core 141 of the coil would occur at the connection point where the coil connection terminal unit 31 of the magmate 30 is directly in contact with the coil if the coil 14 is shaken or impacted, and even corrosion would occur at the above point. To prevent these problems, resin 50 fills in the coil connection space unit 21 where the core 141 of the coil and the coil connection terminal unit 31 of the magmate 30 are contacted, and the filled resin hardens therein. Resin 50 is made from insulating material, keeps the insulation at the core 141 after being filled in and hardened, and protects the core from outside. Of course, the resin reinforces the strength of the core 141 by blocking the transfer of the outer forces on the core 141.

Meanwhile, the magmate 30 inserted into the tap terminal 20 must be connected to an outer electrical terminal 42. The invention is configured such that the terminal connection terminal unit 32 has the contact portion 32a which is adapted to be in contact with the outer electrical terminal 42 for the electrical connection. As described above, the connector 40 is provided with the outer electrical terminal 42 that is in contact with the contact portion 32a of the terminal connection terminal unit 32, and the connector 40 surrounds and engages with the tap terminal 20 while the magmate 30 engages with the tap terminal 20.

FIGS. 4 and 6 shows that as the connector 40 is engaged with the tap terminal 20, the outer electrical terminal 42 is inserted into the terminal connection space unit 22 of the tap terminal 20 and then becomes contact with the contact portion 32a, resulting in the electrical connection. Referring to the drawings, the contact portion 32a protrudes inwardly by the bending of the front of the terminal connection terminal unit 32 backwardly between the front and rear of the terminal connection terminal unit 32. The invention is characterized in that the terminal connection terminal unit 32 is inserted into the terminal connection space unit 22 that is separate by the barrier 23 from the coil connection space unit 21 in which resin 50 fills, so that resin 50 does not overflow into the terminal connection space unit 22 during the filling in the coil connection space unit 21, thereby preventing the resin 50 from being applied to the contact portion 32a. Therefore, resin 50 can be easily filled in the coil connection space unit 21.

The motor as described above and shown in the drawings is merely one example to carry out the present invention, and cannot be construed as limiting the technical spirit of the invention. The scope of protection of the invention is determined only by the accompanying claims and various modifications and alterations of the embodiments not departing from the features of the invention are within the scope of the present invention insofar as they are obvious from those skilled in the art.

INDUSTRIAL APPLICABILITY

The present invention designed as described above is characterized in that a tab terminal coupled to a magmate is divided into one portion connected to a coil and the other portion connected to an external electric terminal, and a resin fills in only the portion connected to the coil. Therefore, the motor can be easily manufactured by preventing a resin from being applied to the portion connected to the external electric terminal.

The invention claimed is:

1. A motor comprising:
   a stator which contains a core insulated with an insulator and wrapped with a coil therearound, wherein the coil includes an aluminum core wire with a coating film therearound;
   a tab terminal including at least one slit in which the coil is inserted; and
   a magmate that is inserted into the tab terminal by forming both the slit to which the coil is electrically connected through insertion and a contact unit which contacts the external electric terminal for an electric connection,
   characterized in that the tab terminal is divided by a barrier into a coil connection space unit and a terminal connection space unit, and the slit opened from the upper side to the lower side is formed on an outer wall of the coil connection space unit to allow the insertion of the coil;
   in that the magmate comprises: a coil connection terminal unit inserted into the coil connection space unit, a terminal connection terminal unit inserted into the terminal connection space unit, and a connection unit connecting the coil connection terminal unit to the upper portion of the terminal connection terminal unit; that the slit of the magmate is formed in the coil connection terminal unit to correspond to the slit of the coil connection space unit; that the contact unit of the magmate is formed in the terminal connection terminal unit; that the coil inserted into the slit of the tab terminal is electrically connected to the magmate through the insertion into the slit of the coil connection terminal unit while the coil connection terminal unit and terminal connection terminal unit of the magmate are respectively inserted into the coil connection space unit and terminal connection space unit of the tab terminal; and that the resin fills in and seals the coil connection space unit.

2. The motor as defined in claim 1, wherein the tab terminal is formed on the insulator to be integral with the insulator.

3. The motor as defined in claim 1, further comprising a connector having an outer electric terminal to be in contact with the terminal connection terminal unit such that the connector is connected to the tab terminal.

\* \* \* \* \*